Jan. 19, 1937.　　　　R. E. LJUNGKULL　　　　2,068,555
CAR BODY WITH BULL GEAR FOR EXCAVATING MACHINES
Original Filed April 23, 1934　　2 Sheets-Sheet 1
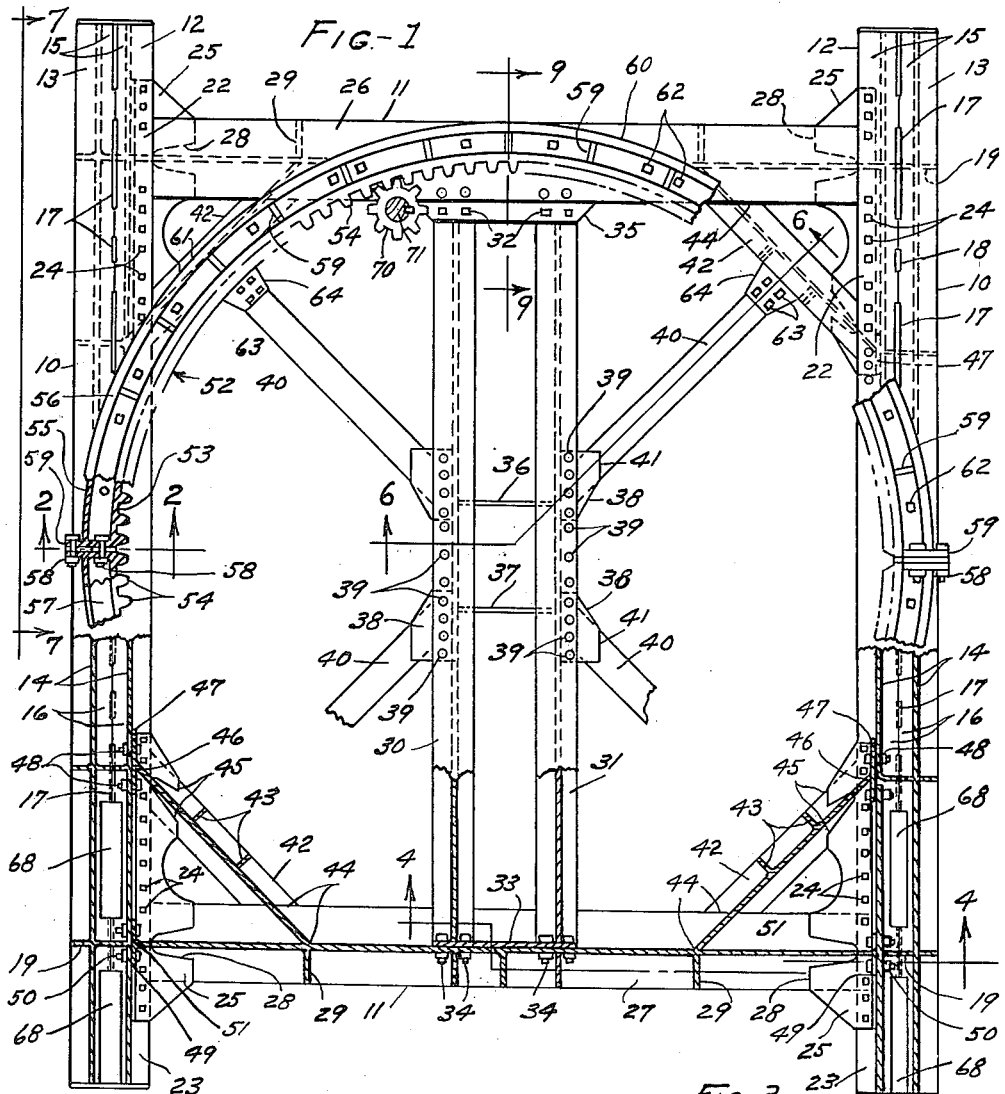
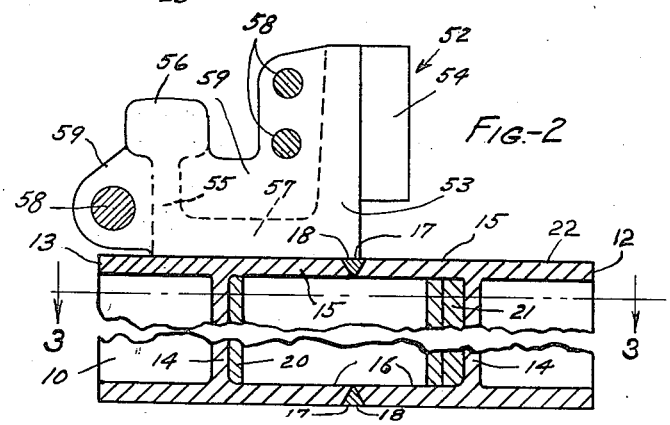
INVENTOR
ROLF E. LJUNGKULL
By G. H. Braddock
ATTORNEY

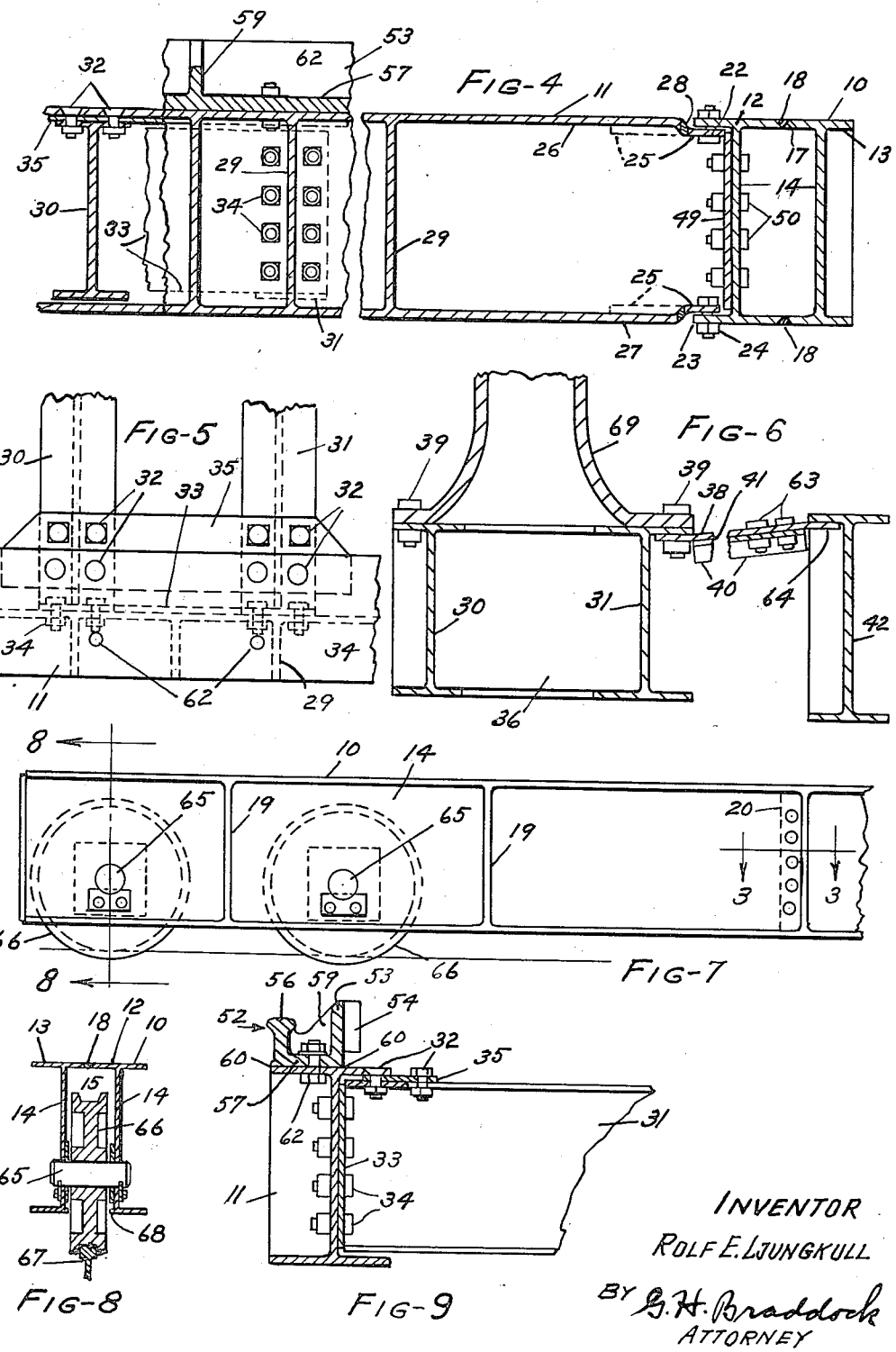

Patented Jan. 19, 1937

2,068,555

UNITED STATES PATENT OFFICE 2,068,555

CAR BODY WITH BULL GEAR FOR EXCAVATING MACHINES

Rolf E. Ljungkull, St. Paul, Minn., assignor to American Hoist and Derrick Company, St. Paul, Minn., a corporation of Delaware Original application April 23, 1934, Serial No. 721,983. Divided and this application March 23, 1936, Serial No. 70,437. In Canada April 15, 1935

20 Claims. (Cl. 105—28)

This application is a division of my pending application Serial No. 721,983, for excavating machines, filed April 23, 1934.

The invention relates to a car body with bull gear more especially adapted for use as the supporting and transporting structure of excavating machines, and other machines of the same general nature.

An object of the invention is to provide a car body with bull gear for an excavating or like machine wherein will be incorporated various improved features and characteristics of construction novel both as individual entities of the car body or machine and in combination with each other.

A further object is to provide a car body for an excavating or like machine having a bull gear associated therewith in novel and improved manner.

A further object is to provide a car body for an excavating or like machine which will be of novel and improved construction and will be associated with a bull gear carried by the car body in novel and improved manner.

And a further object is to provide a car body or supporting structure with bull gear for excavating or like machines which will include entities designed to render the car body with bull gear an improvement generally over more or less similar structures heretofore known.

With the above objects in view, as well as others which will appear as the specification proceeds, the invention comprises the construction, arrangement and combination of parts as now to be fully described and as hereinafter to be specifically claimed, it being understood that the disclosure herein is merely illustrative and intended in no way in a limiting sense, changes in details of construction and arrangement of parts being permissible so long as within the spirit of the invention and the scope of the claims which follow.

In the accompanying drawings forming a part of this specification,

Fig. 1 is a top plan view, partially in section and partially broken away, disclosing the novel car body and bull gear associated therewith;

Fig. 2 is an enlarged vertical sectional view, taken as on line 2—2 in Fig. 1, detailing features of the car body and bull gear;

Fig. 3 is a reduced horizontal sectional view, taken as on line 3—3 in Figs. 2 and 7, detailing features of the car body;

Fig. 4 is an enlarged vertical, transverse sectional view, taken as on line 4—4 in Fig. 1, detailing additional features of the car body;

Fig. 5 is a fragmentary plan view of the car body;

Fig. 6 is an enlarged vertical sectional view, taken as on line 6—6 in Fig. 1, detailing still additional features of the car body;

Fig. 7 is a fragmentary side elevational view of the car body;

Fig. 8 is a detail sectional view of a car wheel and its mounting, taken on line 8—8 in Fig. 7; and Fig. 9 is a detail sectional view of the car body and bull gear, taken on line 9—9 in Fig. 1.

With respect to the drawings and the numerals of reference thereon, the car body of the invention includes longitudinally extending frame members 10 at the sides of said car body, and transversely extending frame members 11 at the ends of said car body. Each side frame member 10 consists of a pair of elongated I-beams, denoted 12 and 13, respectively, having the body portions or webs 14 of said I-beams disposed vertically and parallelly with each other, and having the meeting edges of adjacent upper and lower flanges, denoted 15 and 16, respectively, of said I-beams welded together, as shown very clearly at 17. Portions of the meeting edges of the upper flanges 15 and the lower flanges 16 are cut away, and metal 18 to weld said flanges together is placed in said cut-away portions in any well known manner. Also at spaced apart intervals along the lengths of the side frame members 10, the connected I-beams are desirably reinforced by transverse webs 19 welded to the body portions or webs 14 and to the flanges of said I-beams, as well as by U-bars 20 and filler bars 21 between adjacent body portions or webs 14, the U-bars and filler bars being shown as riveted to the body portions or webs. The transverse webs 19, U-bars 20 and filler bars 21 could be attached to the I-beams in a manner different from that shown. Each end frame member 11 consists of an I-beam extending between the side frame members 10, there being an end frame member 11 adjacent each end of the car body in spaced relation to the outermost extremities of said side frame members 10. The end frame members 11 are perpendicular to the side frame members 10. The innermost upper and lower flanges, denoted 22 and 23, respectively, of the side frame members 10 detachably support, as by screw bolts 24, plates 25 at the inner sides of the upper and lower flanges, denoted 26 and 27, respectively, of the opposite end portions of each end frame member 11, and said plates 25 are welded to said upper and lower flanges 26 and 27, as at 28. The end frame members or I-beams 11 are desirably reinforced by transverse webs 29. Said end frame members or I-beams 11 are themselves interconnected by spaced apart I-beams, denoted 30 and 31, respectively, extending lengthwise of the car body at opposite sides of the longitudinal center thereof. Opposite end portions of the upper and lower flanges of said I-beams 30 and 31 are detachably connected, as by screw bolts 32, to adjacent flanges of the end frame members or I-beams 11, the flanges of said I-beams 30 and 31 lying between the flanges of said I-beams 11. Also, the I-beams 30 and 31 include transverse webs 33 at the opposite ends thereof, which webs are bolted, as at 34 in Figs. 1 and 4, to the body portions or webs of the I-beams 11. As shown in Figs. 1, 4, and 5, a plate 35 is interposed between an upper flange of each I-beam 11 and the flanges upon the adjacent ends of the I-beams 30 and 31, and said I-beams 30 and 31 are bolted as at 32 to said plates 35 as well as to the I-beams 11. A pair of reinforcing plates, denoted 36 and 37, respectively, extend transversely of the car body at the opposite sides of the transverse center thereof, said plates 36 and 37 lying between the bodies or webs of the I-beams 30 and 31 and being welded or otherwise fastened to said I-beams 30 and 31. As shown more clearly in Figs. 1 and 6, four plates, each denoted 38, are bolted, as at 39, to the upper, outer flanges of the I-beams 30 and 31, said plates 38 being equally spaced from the vertical axis of the car body and at equal distances apart. Each plate 38 is welded to a channel member 40, as at 41, and each of the four channel members 40 extends horizontally outwardly toward a corner of the car body. A relatively short I-beam 42 adjacent each corner of the car body extends obliquely to the side and end frame members 10 and 11 desirably at a forty-five degree angle to each frame member. The I-beam 42 may include reinforcing webs 43. An end portion of each I-beam 42 is suitably welded to an end frame member or I-beam 11, as at 44, and the upper and lower flanges of the opposite end portion of each I-beam 42 are welded to the upper and lower plates 25, as at 45. The body portion or web of each I-beam 42 is welded as at 46 to a vertical plate 47 which is detachably bolted, as at 48, to the body portion or web of the inner I-beam of each side frame member. Obviously, there are four vertical plates 47. In addition, there are four vertical plates 49 bolted as at 50 to the body portion or web of the inner I-beam of each side frame member to which the opposite end portions of each end frame member or I-beam 11 are welded as at 51. The outer ends of the channel members 40 are bolted as at 63 to plates 64 welded to the I-beams 42.

Numeral 65 denotes axles for the car wheels 66, said axles being suitably mounted in the body portions or webs of the I-beams of the side frame members as shown more clearly in Figs. 1, 7, and 8. There are eight car wheels as shown, two at each corner of the car body. The car body may be self, or otherwise, propelled along the tracks 67. The car wheels may desirably be of width to about span the space between the body portions or webs of the I-beams of the side frame members, as will be clear from Figs. 1 and 8, and the lower flanges of said I-beams of the side frame members are cut away, as denoted at 68, to accommodate the car wheels.

A bull gear 52 is associated with the car body in novel and improved manner. Said bull gear may consist of an inner annular portion 53 providing an internal, vertically disposed gear surface or toothed portion 54, an annular upstanding or vertical portion 55 providing an operating rail 56 of the bull gear adapted to constitute a lower rail for supporting a revolvable platform of an excavating or other machine, and an annular horizontal portion or web 57 integrally connecting the lower parts of the portions 53 and 55. The bottom surface of the horizontal portion or web 57 is flat. As disclosed, the bull gear consists of two equal halves each extending 180°, and said halves of the bull gear are detachably connected to each other by bolts 58 arranged in reinforcing flanges or webs 59 upon the different halves of said bull gear at the meeting ends of the two halves. The bull gear includes additional reinforcing flanges or webs 59 at spaced intervals about its periphery. In practice, the bull gear can, if desired, be cast as a continuous circumferential member. Preferably, however, it is when so cast cut to provide two diametrical halves detachably connected in the manner as illustrated and described.

As shown in the drawings, the bull gear is placed upon the car body so that the end portions of the detachably connected halves thereof lie directly over the midlengths of the side frame members 10. When said bull gear is upon the car body, the circumference of the horizontal portion or web 57 rests upon the upper flanges of the I-beams 11 and 42, as well as upon the upper flanges of the I-beams 12 and 13; that is, upon the side frame members 10. The bull gear is desirably welded, as at 60, to the upper flanges of the I-beams 11, and is welded, as at 61, to the upper flanges of the I-beams 42. Also, the bull gear is desirably bolted, as at 62, to the side frame members 10 and end frame members 11.

It will be evident from the drawings and the above description that the assembly including the car body and the bull gear is detachable into a plurality of separate units of said car body, which separate units are, each of the side frame members 10, each of the end frame members 11 integrally attached to one diametrical half of the bull gear and to a pair of adjacent I-beams 42, each of the channel pieces 40, and the I-beams 30 and 31 integrally connected by the plates or webs 33, 36, and 37. The plates or webs 33, 36, and 37 may be detachable, and in such case each of the I-beams 30 and 31 is a separate unit of the car body. Obviously, in the disclosure as made, the plates 38 are integral with the channel members 40, the plates 25 are integral with the I-beams 11 and 42, the plates 64 and 47 are integral with said I-beams 42, and the plates 49 are integral with the I-beams 11. The several units constituting the car body and the bull gear can be transported in knocked down condition and assembled at the location where an excavating machine having the car body and bull gear is to find use, as will be understood. Of course, the several units of the car body and the bull gear can be independently constructed when the machine is being manufactured, to be afterwards assembled together and connected in the manner as set forth. That is to say, while the description as given follows a general sequence to produce the car body with bull gear, this sequence can be altered. For example, the two diametrical halves of the bull gear could be welded to the I-beams 11 and 42 either before or after said I-beams are welded to each other and while disassembled from the side frame members 10. Also, the structure including the I-beams 30 and 31 can be assembled with the I-beams 11 either before or after the side frame members 10 and end frame members or I-beams 11 are assembled. And the channels 40 can be assembled into the structure during any preferred stage of its manufacture. What is meant is, that the units of the car body with bull gear as illustrated and described are not only separate units, but are as well units which can be independently made and, speaking generally, independently assembled together.

A platform (not shown) is adapted to be revolvably supported upon the car body through the instrumentality of a king pin 69, the operative rail 56 of the bull gear 52, an upper rail (not shown) on the platform, and rollers or wheels of a container ring (not shown) between said operative rail and upper rail. The king pin 69 is bolted as at 39 to the upper flanges of the I-beams 30 and 31 and extends vertically upward. Said king pin may additionally be welded to said I-beams 30 and 31, as well as to the reinforcing plates 36 and 37. The lower portion of the king pin is of rectilinear conformation, and the upper portion thereof is of reduced, cylindrical shape. The king pin is directly above the longitudinal and transverse center of the car body as disclosed. The revolvable platform will include a bearing portion, arranged concentric to the upper rail, adapted to receive the king pin, said bearing portion also being concentric to the operative rail 56 of the bull gear 52, arranged directly below the upper rail. The container ring with rollers or wheels will lie between said operative rail and upper rail.

Means for revolving the platform in either direction may include a pinion 70 meshing with the gear surface or toothed portion 54, a vertical shaft 71 fixedly carrying the pinion, and means (not shown), desirably on the platform, for supporting and rotating said shaft.

What is claimed is:

1. In a car body, a knock-down framing structure comprising side frame members extending longitudinally of said car body, end frame members extending transversely of said car body, means for detachably connecting meeting portions of said side frame members and said end frame members to each other, and a bull gear comprising a plurality of separate part-circle elements, each part-circle element of said bull gear being independently welded to one of said frame members.

2. In a car body, a knock-down framing structure comprising side frame members extending longitudinally of said car body, end frame members extending transversely of said car body, means for detachably connecting meeting portions of said side frame members and said end frame members to each other, and a bull gear comprising a plurality of separate part-circle elements, each part-circle element of said bull gear being independently attached to one of said frame members.

3. In a car body, a knock-down framing structure comprising side frame members extending longitudinally of said car body, end frame members extending transversely of said car body, means for detachably connecting meeting portions of said side frame members and said end frame members to each other, reinforcing members each having one of its end portions attached to one of said frame members, means for detachably connecting the opposite end portion of each reinforcing member to another of said frame members, there being one of said reinforcing members extending obliquely to side and end frame members at each corner of the framing structure, and a bull gear comprising a plurality of separate part-circle elements, each part-circle element of said bull gear being independently and permanently attached to one of said frame members.

4. In a car body, a knock-down framing structure comprising side frame members each consisting of welded together I-beams extending longitudinally of said car body and having their webs disposed vertically and their upper and lower adjacent flanges welded to each other, end frame members each consisting of a transversely extending I-beam having its web disposed vertically, means for detachably connecting meeting portions of said side frame members and said end frame members to each other, and a bull gear comprising a plurality of separate part-circle elements adapted to be detachably connected to each other, each of said separate part-circle elements being independently and permanently secured to one of said frame members.

5. In a car body, a knock-down framing structure comprising side frame members each consisting of welded together I-beams extending longitudinally of said car body and having their webs arranged in spaced apart relation and disposed vertically and their upper and lower flanges welded to each other, end frame members each consisting of a transversely extending I-beam having its web disposed vertically, means for detachably connecting meeting portions of said side and end frame members to each other, the upper and lower flanges of said end frame members being arranged in the horizontal planes of the upper and lower flanges of said side frame members, respectively, reinforcing members each having one of its end portions welded to one of said frame members and its opposite end portion detachably connected to another of said frame members, a bull gear consisting of separate part-circle elements each welded independently to one of said frame members, and a king pin concentric with said bull gear and removably supported by said framing structure.

6. In a car body, a knock-down framing structure comprising side frame members each consisting of welded together I-beams extending longitudinally of said car body and having their webs disposed vertically and their upper and lower flanges welded to each other, end frame members each consisting of a transversely extending I-beam having its web disposed vertically, means for detachably connecting meeting portions of said side frame members and said end frame members to each other, reinforcing members each having one of its end portions welded to one of said frame members, means for detachably connecting the opposite end portion of each of said reinforcing members to another of said frame members, a bull gear consisting of separate part-circle elements each welded independently to one of said frame members, and means for detachably connecting said bull gear elements to each other along the length of one of said members.

7. In a car body, a knock-down framing structure comprising side frame members extending longitudinally of said car body, end frame members extending transversely of said car body, means for detachably connecting meeting portions of said side frame members and said end frame members to each other, reinforcing members each having one of its end portions attached to one of said frame members and its opposite end portion detachably connected to another of said frame members, and a bull gear comprising a plurality of separate part-circle elements adapted to be detachably connected to each other, each part-circle element of said bull gear being independently attached to one of said frame members.

8. In a car body, a knock-down framing structure comprising side frame members each consisting of welded together I-beams extending longitudinally of said car body, end frame members each consisting of a transversely extending I-beam, means for detachably connecting meeting portions of said side frame members and said end frame members to each other, reinforcing members each having one of its end portions welded to one of said frame members and its opposite end portion detachably connected to another of said frame members, and a bull gear comprising an annular member consisting of separate and independent arc-shaped elements adapted to be detachably connected to each other, each of said arc-shaped elements being separately and independently permanently connected to one of said detachably connected frame members.

9. In a car body a knock-down framing structure comprising side frame members each consisting of welded together I-beams extending longitudinally of said car body and having their webs disposed vertically and their upper and lower adjacent flanges welded to each other, end frame members each consisting of a transversely extending I-beam having its web disposed vertically, means for detachably connecting meeting portions of said side frame members and said end frame members to each other, a bull gear comprising a plurality of separate part-circle elements adapted to be detachably connected to each other, each of said separate part-circle elements being independently and permanently secured to one of said side frame members, reinforcing members extending between a pair of opposite frame members and detachably connected thereto, and a king pin concentric with said bull gear and supported by said reinforcing members.

10. In a car body, a knock-down framing structure comprising side frame members each consisting of welded together I-beams extending longitudinally of said car body and having their webs disposed vertically and their upper and lower flanges welded to each other, end frame members each consisting of a transversely extending I-beam having its web disposed vertically, means for detachably connecting meeting portions of said side frame members and end frame members to each other, reinforcing members each having one of its end portions welded to one of said frame members and detachably connected to another of said frame members, additional reinforcing members extending between an opposite pair of said frame members and detachably connected thereto, a bull gear comprising a pair of part-circle elements, and means for detachably connecting said elements to each other, each of said part-circle elements being separately and independently welded to one of said frame members, and said means for detachably connecting said elements to each other being situated along the lengths of frame members adjacent those to which the elements are welded.

11. In a car body, a knock-down framing structure comprising side frame members extending longitudinally of said car body, end frame members extending transversely of said car body, means for detachably connecting adjacent portions of said side frame members and said end frame members to each other, and a bull gear comprising a plurality of separate part-circle elements adapted to be detachably connected to each other, each part-circle element of said bull gear being independently secured to one of said frame members.

12. In a car body, a knock-down framing structure comprising side frame members each consisting of welded together I-beams extending longitudinally of said car body and having their webs arranged in spaced apart relation and disposed vertically and their upper and lower flanges welded to each other, end frame members each consisting of a transversely extending I-beam having its web disposed vertically, means for detachably connecting meeting portions of said side and end frame members to each other, the upper and lower flanges of said end frame members being arranged in horizontal planes of the upper and lower flanges of said side frame members, respectively, reinforcing members each having one of its end portions welded to one of said frame members and its opposite end portion detachably connected to another of said frame members, there being one of said reinforcing members extending obliquely to side and end frame members at each corner of the framing structure, a bull gear consisting of separate part-circle elements each secured independently to one of said frame members, a king pin concentric with said bull gear, and means upon said framing structure removably supporting said king pin.

13. In a car body, a knock-down framing structure comprising side frame members each consisting of welded together I-beams extending longitudinally of said car body and having their webs disposed vertically and their upper and lower flanges welded to each other, end frame members each consisting of a transversely extending I-beam having its web disposed vertically, means for detachably connecting meeting portions of said side frame members and said end frame members to each other, reinforcing members each having one of its end portions welded to one of said frame members, there being one of said reinforcing members extending obliquely to side and end frame members at each corner of the framing structure, means for detachably connecting the opposite end portion of each of said reinforcing members to another of said frame members, a bull gear consisting of a pair of separate part-circle elements each secured independently to one of said frame members, and means for detachably connecting adjacent ends of the part-circle bull gear elements to each other.

14. In a car body, a knock-down framing structure comprising side frame members extending longitudinally of said car body, end frame members extending transversely of said car body, means for detachably connecting meeting portions of said side frame members and said end frame members to each other, reinforcing members each having one of its end portions attached to one of said frame members and its opposite end portion detachably connected to another of said frame members, there being one of said reinforcing members extending obliquely to side and end frame members at each corner of the framing structure, and a bull gear comprising a plurality of separate part-circle elements adapted to be detachably connected to each other, each part-circle element of said bull gear being independently attached to one of said frame members.

15. In a car body, a knock-down framing structure comprising side frame members each consisting of welded together I-beams extending longitudinally of said car body, end frame members each consisting of a transversely extending I-beam, means for detachably connecting meeting portions of said side frame members and said end frame members to each other, reinforcing members each having one of its end portions welded to one of said frame members and its opposite end portion detachably connected to another of said frame members, there being one of said reinforcing members extending obliquely to side and end frame members at each corner of the framing structure, and a bull gear comprising an annular member consisting of separate and independent arc-shaped elements adapted to be detachably connected to each other, each of said arc-shaped elements being separately and independently permanently connected to one of said detachably connected frame members.

16. In a car body, a knock-down framing structure comprising side frame members each consisting of welded together I-beams extending longitudinally of said car body and having their webs disposed vertically and their upper and lower flanges welded to each other, end frame members each consisting of a transversely extending I-beam having its web disposed vertically, means for detachably connecting meeting portions of said side frame members and said end frame members to each other, reinforcing members each having one of its end portions welded to one of said frame members and detachably connected at its other end portion to another of said frame members, there being one of said reinforcing members extending obliquely to side and end frame members at each corner of the framing structure, additional reinforcing members extending between an opposite pair of said frame members and detachably connected thereto, a bull gear comprising a pair of half-circle elements, and means for detachably connecting said elements to each other, each of said half-circle elements being separately and independently welded to one of said frame members, and said means for detachably connecting said elements to each other being situated along the lengths of frame members adjacent those to which the elements are welded.

17. In a car body, a knock-down framing structure comprising side frame members, end frame members, means for detachably connecting adjacent portions of said side frame members and said end frame members to each other, and a bull gear including a plurality of separate part-circle elements, each part-circle element of said bull gear being independently attached to one of said frame members.

18. In a car body, a knock-down framing structure comprising side frame members, end frame members, means for detachably connecting adjacent portions of said side frame members and said end frame members to each other, reinforcing members each having one of its end portions attached to one of said frame members, means for detachably connecting the opposite end portion of each reinforcing member to another of said frame members, and a bull gear including a plurality of separate part-circle elements, each part-circle element of said bull gear being independently attached to one of said frame members.

19. In a car body, a knock-down framing structure comprising side and end frame members, means for detachably connecting said side frame members and said end frame members to each other, and a bull gear supported by said frame members, said bull gear including a plurality of part-circle elements each independently attached to one of said frame members.

20. In a car body, a knock-down framing structure comprising side frame members, end frame members, means for detachably connecting said side frame members and said end frame members to each other, reinforcing members each having one of its end portions attached to one of said frame members, means for detachably connecting the opposite end portion of each reinforcing member to another of said frame members, and a bull gear supported by said frame members, said bull gear including a plurality of part-circle elements each independently attached to one of said frame members.

ROLF E. LJUNGKULL.